United States Patent [19]
Primeaux, II

[11] Patent Number: 5,162,388
[45] Date of Patent: Nov. 10, 1992

[54] ALIPHATIC POLYUREA ELASTOMERS

[75] Inventor: Dudley J. Primeaux, II, Elgin, Tex.

[73] Assignee: Texaco Chemical Company, White Plains, N.Y.

[21] Appl. No.: 709,931

[22] Filed: Jun. 4, 1991

[51] Int. Cl.$^5$ .............................................. C08G 18/14
[52] U.S. Cl. .................................. 521/159; 521/163; 524/874; 528/76
[58] Field of Search ............... 521/159, 163; 524/874; 528/76

[56] References Cited

U.S. PATENT DOCUMENTS 4,705,814  11/1987  Grigsby .................................. 528/76

*Primary Examiner*—Maurice J. Welsh
*Attorney, Agent, or Firm*—Robert A. Kulason; James J. O'Loughlin; Dominick G. Vicari

[57] ABSTRACT

An aliphatic polyurea elastomer is disclosed. The elastomer comprises an (A) and a (B) component. The (A) component includes an aliphatic isocyanate. The (B) component includes an amine terminated polyoxyalkylene polyol and a chain extender including an aliphatic spray polyurea elastomer comprising an (a) component which includes an aliphatic isocyanate and a (b) component which includes (1) an amine terminated polyoxyalkylene polyol and (2) a chain extender including cis-1,4-diaminocyclohexane, isophoronediamine, m-xylenediamine, 4,4'-methylenedicyclohexylamine, methanediamine, 1,4-diaminoethylcyclohexane and substituted derivatives thereof. Preferably, the chain extender includes cis-1,4-diaminocyclohexane, isophoronediamine or mixtures thereof.

24 Claims, No Drawings

ALIPHATIC POLYUREA ELASTOMERS

BACKGROUND OF THE INVENTION

1. Field of the Invention

The present invention relates to aliphatic polyurea elastomers.

2. Description of Background Art

Polyurea elastomer systems are commonly recognized as coating materials, with spray polyurea elastomer systems being particularly useful when employed in this capacity. One of the shortcomings associated with aromatic polyurea elastomer systems, which generally are prepared by reacting an aromatic isocyanate with an active hydrogen component in the presence of an aromatic chain extender, is that they exhibit poor stability when exposed to ultraviolet radiation. This becomes particularly problematic when the substrate to be coated, for example, a rooftop, is continuously subjected to ultraviolet exposure. The resulting ultraviolet degradation of the elastomer system is typically manifested by a change in color; a general loss of product integrity, such as cracking; and an adverse reduction in properties, such as tensile strength, tear strength and elongation, to name a few.

The most widely employed aromatic chain extender is diethylenetoluenediamine (DETDA), a product of Ethyl Corp. In addition to providing an ultraviolet unstable system, DETDA provides a rigid elastomer system which, because of the rigidity, has difficulty in assuming the detail or contour of the substrate to be coated. However, polyurea elastomer systems fabricated from, among other things, DETDA generally exhibit good processing characteristics. Thus, there is a recognized need for a polyurea elastomer system that exhibits ultraviolet stability and increased flexibility, i.e., less rigidity, while exhibiting good processing characteristics.

To provide an ultraviolet stable system, however, non-aromatic, i.e., aliphatic, components should be employed. For instance, Rowton, R. L., CYANOETHYLATED POLYOXYPROPYLENEPOLYAMINES: POLYMER FORMERS OF UNIQUE REACTIVITY, Journal of Elastomers and Plastics, Vol. 9, October 1977, describes cyanoethylated polyoxypropylenepolyamines as the hydrogen component in polyurea systems to provide light stable systems. Rowton is silent with respect to employing aliphatic chain extenders.

Some of the known aliphatic chain extenders include trans-1, 4-diaminocyclohexane and 1,6-diaminohexane. These and other known aliphatic chain extenders react very rapidly with isocyanate and, therefore, cannot be used in spray systems, inasmuch as polymerization occurs so rapidly that the polymer is virtually unsprayable. Therefore, while the aliphatic polyurea elastomers of the present invention can be used in reaction injection molding (RIM) systems, it is to be noted that the advantage provided by the present invention is more noteworthy in spray systems, relative to other elastomer systems where sprayability is not at issue, such as RIM systems.

Other low molecular weight, linear primary amine chain extenders exhibit a rapid reactivity that result in poor mixing and elastomer cure.

Additionally, elastomer systems prepared with known aliphatic chain extenders have notoriously exhibited processing characteristics inferior to those exhibited by systems fabricated from DETDA.

U.S. Pat. No. 3,666,788 is directed to cyanoalkylated polyoxyalkylene polyamines which are specifically described as being useful as curing agents in polyurea coatings. Similarly, U.S. Pat. No. 3,714,128 describes cyanoalkylated polyoxyalkylene polyamines which are useful for slowing the gelling or hardening of the polyurea component so that good mixing of the isocyanate and amine components can be attained, which gives the sprayed material ample time to adhere and level before gelation of the polyurea coating occurs. Neither of these patents describe the present cycloaliphatic diamines as chain extenders in aliphatic spray polyurea elastomer systems.

Polyoxyalkylene polyamines, particularly JEFFAMINE ® T-403, D-400 and D-230, are described as chain extenders in U.S. Pat. No. 4,732,919; however, this patent relates to an aromatic system which is to be used in a RIM application.

Commonly assigned U.S. patent application Ser. No. 402,296, filed Sep. 5, 1989, describes aliphatic spray polyurea elastomers comprising an (A) component which includes an aliphatic isocyanate and a (B) component which includes (1) an amine terminated polyoxyalkylene polyol, and (2) an amine terminated chain extender.

Thus, it is my understanding that an aliphatic polyurea elastomer system which incorporates the particular aliphatic chain extenders described hereinbelow and which exhibits ultraviolet stability, increased flexibility and favorable processing characteristics has heretofore been unavailable.

SUMMARY OF THE INVENTION

Accordingly, the present invention relates to an aliphatic spray polyurea elastomer which comprises an (A) component and a (B) component. The (A) component includes an aliphatic isocyanate. The isocyanate of the (A) component preferably comprises a quasi-prepolymer of an aliphatic isocyanate and a material selected from at least one polyol, a high molecular weight polyoxyalkyleneamine, or a combination of these materials. The (B) component includes (1) an amine terminated polyoxyalkylene polyol, and (2) a chain extender including cis-1,4-diaminocyclohexane, isophoronediamine, m-xylylenediamine, 4,4'-methylenedicyclohexylamine, menthanediamine, 1,4-diaminomethylcyclohexane, and substituted derivatives thereof.

It has advantageously been discovered that the polyurea elastomer system of the present invention is ultraviolet stable, exhibits increased flexibility, and possesses favorable processing characteristics. Additionally, the low temperature elongation and green strength of the present spray polyurea elastomer system are extremely good. Furthermore, since the present elastomer system is 100 percent solids, no solvent is required to promote spraying, when the elastomer is used in that capacity.

DESCRIPTION OF THE PREFERRED EMBODIMENTS

The aliphatic polyurea elastomer system of the present invention generally includes two components, an (A) component and a (B) component. In particular, the (A) component includes an aliphatic isocyanate. The aliphatic isocyanates employed in component (A) are those known to one skilled in the art. Thus, for instance, the aliphatic isocyanates are of the type described in U.S. Pat. No. 4,748,192. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylylene diisocyanate, such as the tetramethyl xylylene diisocyanate. Cyclohexane diisocyanate is also considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3- and 1,4-cyclohexane diisocyanate as well as any desired mixture of these isomers; 1-isocyanato-3,3, 5-trimethyl-5-isocyanatomethylcyclohexane(isophorone diisocyanate); 4,4'-, 2,2'- and 2,4'-dicyclohexylmethane diisocyanate as well as the corresponding isomer mixtures, and the like. The aforementioned isocyanates can be used alone or in combination.

It is to be understood that the term "aliphatic isocyanate" also includes quasi-prepolymers of aliphatic isocyanates with active hydrogen-containing materials. The active hydrogen-containing materials can include a polyol or a high molecular weight polyoxyalkyleneamine, also described hereinbelow as amine terminated polyethers, or a combination of these materials.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide, or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated quasi-prepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment, the amine terminated polyethers have an average molecular weight of at least about 2,500. These materials may be made by various methods known in the art.

The amine terminated polyether resins useful in this invention are, for example, polyether resins made from an appropriate initiator to which lower alkylene oxides, such as ethylene oxide, propylene oxide, butylene oxide, or mixtures thereof, are added with the resulting hydroxyl terminated polyol then being aminated. When two or more oxides are used, they may be present as random mixtures or as blocks of one or the other polyether. In the amination step, it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used, it is desirable to cap the hydroxyl terminated polyol with a small amount of higher alkylene oxide to insure that the terminal hydroxyl groups are essentially all secondary hydroxyl groups. The polyols so prepared are then reductively aminated by known techniques, for example, as described in U.S. Pat. No. 3,654,370, the content of which is incorporated herein by reference.

In the practice of this invention, a single high molecular weight amine terminated polyol may be used. Also, mixtures of high molecular weight amine terminated polyols, such as mixtures of di- and trifunctional materials and/or different molecular weight or different chemical composition materials, may be used.

Also, high molecular weight amine terminated polyethers or simply polyether amines are included within the scope of this invention and may be used alone or in combination with the aforementioned polyols. The term "high molecular weight" is intended to include polyether amines having a molecular weight of at least about 2,000. Particularly preferred are the JEFFAMINE series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

The (B) component of the present polyurea elastomer system includes an amine terminated polyoxyalkylene polyol and certain specific cycloaliphatic diamine chain extenders. The amine terminated polyoxyalkylene polyol is preferably selected from diols or triols and, most preferably, includes a blend of diols and/or triols. The particular polyols, i.e., diols and/or triols, employed in component (B) are the same as those described hereinabove in connection with the quasi-prepolymer of component (A).

The cycloaliphatic diamine chain extender of component (B) can include cis-1,4-diaminocyclohexane; isophoronediamine; m-xylylenediamine; 4,4'-methylenedicyclohexylamine; menthanediamine; 1,4-diaminomethylcyclohexane and substituted derivatives thereof. Laromin® C-260, available from BASF Corp. is representative of a substituted 4,4'-methylenedicyclohexylamine derivative. In a most preferred embodiment, the cycloaliphatic diamine chain extender of component (B) is selected from cis-1,4-diaminocyclohexane and isophoronediamine.

These cycloaliphatic diamine chain extenders give the elastomer system the requisite activity to yield good cure and good spray processing characteristics. Additionally, the thus formed aliphatic system is ultraviolet stable and exhibits improved flexibility so that it can be effectively sprayed onto even the most intricately shaped substrate.

Other conventional formulation ingredients may be employed in component (A) or (B) as needed, such as, for example, foam stabilizers, also known as silicone oils or emulsifiers. The foam stabilizers may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40, and the oxyalkylene groups are derived from propylene oxide and ethylene oxide. See, for example, U.S. Pat. No. 3,194,773. Pigments, for example, titanium dioxide, may be incorporated in the elastomer system, preferably in the (B) component, to impart color properties to the elastomer.

Reinforcing materials, if desired, useful in the practice of our invention are known to those skilled in the art. For example, chopped or milled glass fibers, chopped or milled carbon fibers, and/or other mineral fibers are useful.

Post curing of the elastomer of the invention is optional. Post curing will improve some elastomeric properties, such as heat sag. Employment of post curing depends on the desired properties of the end product.

The (A) component and (B) component of the present polyurea elastomer system are combined or mixed under high pressure; most preferably, they are impingement mixed directly in the high pressure spray equipment which is, for example, a GUSMER ® H-V proportioner fitted with a GUSMER Model GX-7 spray gun. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then coated onto the desired substrate via the spray gun.

The volumetric ratio of the (A) component to the (B) component is generally from about 30 to 70 percent to about 70 to 30. Preferably, component (A) and component (B) are employed in a 1:1 volumetric ratio.

Advantageously, the (A) and (B) components react to form the present elastomer system without the aid of a catalyst.

| GLOSSARY OF TERMS AND MATERIALS | |
|---|---|
| JEFFAMINE T-5000 | Polypropylene oxide triamine of about 5000 molecular weight; a product of Texaco Chemical Company. |
| JEFFAMINE D-4000 | Polypropylene oxide diamine of about 4000 molecular weight; a product of Texaco Chemical Company. |
| JEFFAMINE D-2000 | Polypropylene oxide diamine of about 2000 molecular weight; a product of Texaco Chemical Company. |
| JEFFAMINE T-403, D-400 and D-230 | are described with particularity hereinabove. |

The following Examples I–X are provided to further illustrate preferred embodiments of the present invention and should not be construed as limiting the present invention in any way.

EXAMPLE I

The (A) component of an aliphatic polyurea elastomer was prepared by combining 40 parts of a quasi-prepolymer of m-tetramethylxylene diisocyanate (m-TMXDI) with 60 parts JEFFAMINE D-2000. The (B) component was prepared by combining 44.35 parts of JEFFAMINE T-5000, 44.35 parts of JEFFAMINE D-2000, and 11.30 parts of 1,4-diaminocyclohexane.

The 1,4-diaminocyclohexane used in this example was a 50:50 mixture of the trans- (solid) and cis- (liquid) isomer. The components were mixed at a volumetric ratio (A:B) of 1.00 (1.05 A:B weight ratio) in the high pressure spray equipment to produce the aliphatic polyurea elastomer with a gel time of approximately three seconds. The elastomer was slightly tacky (sticky). Good green strength was noted. It was later discovered that the trans-isomer showed some incompatibility in the component, as evidenced by the presence of insoluble solid particles in the elastomer. No physical property testing was done.

EXAMPLE II

The (A) component of an aliphatic polyurea elastomer was prepared by combining 50 parts of m-TMXDI with 50 parts of JEFFAMINE D-2000. The (B) component was prepared by combining 37.45 parts of JEFFAMINE T-5000, 37.45 parts of JEFFAMINE D-2000, and 25.10 parts of isophorodiamine (IPDA). The (A) and (B) components were mixed as in Example I and at the same volumetric and weight ratios. The isocyanate index was 1.05. The resulting elastomer exhibited a gel time of approximately one second and a tack free time of five seconds.

The physical properties of the elastomer produced in Example II were determined; the results are reported in Table I.

TABLE I

| | |
|---|---|
| Tensile strength (psi) | 935 |
| Elongation (%) | 356 |
| Tear (p/i) | 306 |
| Shore D hardness (0 sec) | 44 |
| 100% modulus (psi) | 763 |
| 300% modulus (psi) | 890 |

EXAMPLES III–V

In these examples, three additional aliphatic polyurea elastomers were prepared in the manner set forth in Examples I and II. In each example (i.e., Examples III, IV and V), the (A) component of the elastomer was prepared by combining 40 parts of m-TDXDI and 60 parts of JEFFAMINE D-2000. Table II is provided below to show the materials used to prepare the (B) component in each of the subject examples. Table II also included other particulars respecting the elastomers prepared in Examples III–V.

TABLE II

| | Example III | Example IV | Example V |
|---|---|---|---|
| Materials (For (B) Component) | | | |
| JEFFAMINE T-5000 | 44.45 | 87.7 | 37.75 |
| JEFFAMINE D-2000 | 44.45 | — | 37.75 |
| 1,4-diaminocyclohexane | 11.1 | 12.3 | — |
| JEFFAMINE T-403 | — | — | 24.5 |
| Processing Particulars | | | |
| (A):(B) Vol. ratio | 1.00 | 1.00 | 1.00 |
| (A):(B) Weight ratio | 1.05 | 1.05 | 1.06 |
| Gel time (sec.) | <3.0 | <3.0 | 4.0 |
| Tack free time (sec.) | 20.00 | * | >60 |

*Not tested

EXAMPLES VI–VIII

In these examples, three additional aliphatic polyurea elastomers were prepared in the manner set forth in Examples I, II, and III–V. In each example (i.e., Examples VI, VII and VIII), the (A) component of the elastomer was prepared by combining 60 parts of m-TMXDI and 40 parts of JEFFAMINE D-2000. Table III is provided below to show the materials used to prepare the (B) component in each of the subject examples. Table III also includes other particulars respecting the elastomers prepared in Examples VI–VIII.

TABLE III

| | Example VI | Example VII | Example VIII |
|---|---|---|---|
| Materials | | | |
| (For (B) Component) | | | |
| JEFFAMINE T-5000 | 27.3 | 40.7 | 36.8 |
| JEFFAMINE D-2000 | 18.2 | 27.1 | 24.6 |
| IPDA | — | 32.2 | 19.3 |
| JEFFAMINE T-403 | 25.0 | — | — |
| JEFFAMINE D-230 | 29.5 | — | 19.3 |
| Processing Particulars | | | |
| Index | 1.05 | 1.05 | 1.05 |
| (A):(B) Vol. ratio | 1.00 | 1.00 | 1.00 |
| (A):(B) Weight ratio | 1.06 | 1.02 | 1.04 |
| Gel time (sec.) | 1.5 | 1.0 | 1.0 |
| Tack free time (sec.) | 2.0 | 2.0 | 2.0 |

The physical properties of the elastomers produced in Examples VI–VIII were determined; the results are reported in Table IV.

TABLE IV

| Properties | Example VI | Example VII | Example VIII |
|---|---|---|---|
| Tensile strength (psi) | 1583 | 1300 | 1417 |
| Elongation (%) | 395 | 263 | 428 |
| Tear (p/i) | 347 | 373 | 365 |
| Shore D hardness (0 sec.) | 47 | 46 | 43 |
| 100% modulus (psi) | 1003 | 1105 | 1075 |
| 300% modulus (psi) | 1265 | — | 1200 |

EXAMPLES IX AND X

In these examples, two additional aliphatic polyurea elastomers were prepared in the manner set forth in Examples I, II, III–V and VI–VIII. In each example (i.e., Examples IX and X), the (A) component of the elastomer was prepared by combining 60 parts of m-TMXDI and 40 parts of JEFFAMINE D-2000. Table V is provided below to show the materials used to prepare the (B) component in each of the subject examples. Table V also includes other particulars respecting the elastomers prepared in Examples IX and X.

TABLE V

| | Example IX | Example X |
|---|---|---|
| Materials | | |
| (For (B) Component) | | |
| JEFFAMINE T-5000 | 47.1 | 23.6 |
| JEFFAMINE D-2000 | 31.4 | 55.1 |
| 1,4-diaminocyclohexane | 21.5 | 21.3 |
| Processing Particulars | | |
| Index | 1.05 | 1.05 |
| (A):(B) Vol. ratio | 1.00 | 1.00 |
| (A):(B) Weight ratio | 1.04 | 1.05 |
| Gel time (sec.) | 1.0 | 1.0 |
| Tack free time (sec.) | 1.5 | 2.0 |

The physical properties of the elastomers produced in Examples IX and X were determined; the results are reported in Table VI.

TABLE VI

| Properties | Example IX | Example X |
|---|---|---|
| Tensile strength (psi) | 3181 | 1335 |
| Elongation (%) | 400 | 482 |
| Tear (p/i) | 314 | 346 |
| Shore D hardness (0 sec.) | 32 | 38 |
| 100% modulus (psi) | 793 | 812 |
| 300% modulus (psi) | 1062 | 1046 |

What is claimed is:

1. An aliphatic spray polyurea elastomer comprising an (a) component which includes an aliphatic isocyanate and a (b) component which includes (1) an amine terminated polyoxyalkylene polyol and (2) a chain extender including cis-1,4-diaminocyclohexane, isophoronediamine, m-xylylenediamine, 4,4'-methylenedicyclohexylamine, menthanediamine, 1,4-diaminoethylcyclohexane or substituted derivatives thereof.

2. The elastomer of claim 1 wherein said aliphatic isocyanate is selected from the group consisting of hexamethylene diisocyanate, a bifunctional monomer of tetraalkyl xylylene diisocyanate, cyclohexane diisocyanate, 1,12-dodecane diisocyanate, 1,4-tetramethylene diisocyanate, isophorone diisocyanate, dicyclohexylmethane diisocyanate, and mixtures thereof.

3. The elastomer of claim 1 wherein said aliphatic isocyanate comprises a quasi-prepolymer of an aliphatic isocyanate and an active hydrogen-containing material.

4. The elastomer of claim 3 wherein said active hydrogen-containing material is selected from at least one polyol, a high molecular weight polyoxyalkyleneamine, or a combination thereof.

5. The elastomer of claim 4 wherein said at least one polyol and said amine terminated polyoxyalkylene polyol of component (b) comprise polyether polyols or polyester polyols having an equivalent weight of at least about 500.

6. The elastomer of claim 5 wherein said polyester polyols are polyesters of hydroxyl terminated rubbers.

7. The elastomer of claim 5 wherein said polyether polyols are selected from the group consisting of polyols based on trihydric initiators having a molecular weight of at least about 4000; amine terminated polyether polyols having an average molecular weight greater than 1500, a functionality of from about 2 to about 6 and an amine equivalent weight of from about 750 to about 4000; and mixtures thereof.

8. The elastomer of claim 7 wherein the functionality of said polyether polyols is from about 2 to about 3.

9. The elastomer of claim 5 wherein said polyether polyols are derived from amine terminated polyether resins having greater than 50 percent of their active hydrogens in the form of amine hydrogens.

10. The elastomer of claim 5 wherein said amine terminated polyoxyalkylene polyol of component (b) is selected from diols, triols, or blends thereof.

11. The elastomer of claim 1 further comprising pigments and reinforcing materials, said reinforcing materials being selected from milled or chopped glass fibers or mineral fibers.

12. The elastomer of claim 1 wherein the volumetric ratio of the (a) component to the (b) component is from about 30 to 70 percent of the (a) component to about 70 to 30 percent of the (b) component.

13. An aliphatic spray polyurea elastomer comprising an (a) component which includes an aliphatic isocyanate and a (b) component which includes (1) an amine terminated polyoxyalkylene polyol and (2) a chain extender including cis-1,4diaminocyclohexane or isophoronediamine.

14. The elastomer of claim 13 wherein said aliphatic isocyanate is selected from the group consisting of hexamethylene diisocyanate, a bifunctional monomer of tetraalkyl xylene diisocyanate, cyclohexane diisocyanate, 1,12-dodecane diisocyanate, 1,4-tetramethylene diisocyanate, isophorone diisocyanate, dicyclohexylmethane diisocyanate, and mixtures thereof.

15. The elastomer of claim 13 wherein said aliphatic isocyanate comprises a quasi-prepolymer of an aliphatic isocyanate and an active hydrogen-containing material.

16. The elastomer of claim 15 wherein said active hydrogen-containing material is selected from at least one polyol, a high molecular weight polyoxyalkyleneamine, or a combination thereof.

17. The elastomer of claim 16 wherein said at least one polyol and said amine terminated polyoxyalkylene polyol of component (b) comprise polyether polyols or polyester polyols having an equivalent weight of at least about 500.

18. The elastomer of claim 17 wherein said polyester polyols are polyesters of hydroxyl terminated rubbers.

19. The elastomer of claim 17 wherein said polyether polyols are selected from the group consisting of polyols based on trihydric initiators having a molecular weight of at least about 4000; amine terminated polyether polyols having an average molecular weight greater than 1500, a functionality of from about 2 to about 6 and an amine equivalent weight of from about 750 to about 4000; and mixtures thereof.

20. The elastomer of claim 19 wherein the functionality of said polyether polyols is from about 2 to about 3.

21. The elastomer of claim 17 wherein said polyether polyols are derived from amine terminated polyether resins having greater than 50 percent of their active hydrogens in the form of amine hydrogens.

22. The elastomer of claim 17 wherein said amine terminated polyoxyalkylene polyol of component (b) is selected from diols, triols, or blends thereof.

23. The elastomer of claim 13 further comprising pigments and reinforcing materials, said reinforcing materials being selected from milled or chopped glass fibers or mineral fibers.

24. The elastomer of claim 13 wherein the volumetric ratio of the (a) component to the (b) component is from about 30 to 70 percent of the (a) component to about 70 to 30 percent of the (b) component.

* * * * *